(12) United States Patent
Zeng et al.

(10) Patent No.: US 12,346,231 B2
(45) Date of Patent: Jul. 1, 2025

(54) ELECTRONIC SYSTEM, MONITORING CHIP, AND OPERATION METHOD

(71) Applicant: Realtek Semiconductor Corporation, Hsinchu (TW)

(72) Inventors: Jian Jhong Zeng, Hsinchu (TW); Shih Chin Chi, Hsinchu (TW); Meng Yang Lu, Hsinchu (TW); Neng Hsien Lin, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 67 days.

(21) Appl. No.: 18/348,360

(22) Filed: Jul. 7, 2023

(65) Prior Publication Data
US 2024/0020211 A1 Jan. 18, 2024

(30) Foreign Application Priority Data
Jul. 14, 2022 (TW) .................................. 111126537

(51) Int. Cl.
  *G06F 11/30* (2006.01)
  *G06F 11/32* (2006.01)
  *G06F 13/40* (2006.01)
  *G06F 13/42* (2006.01)

(52) U.S. Cl.
  CPC ........ *G06F 11/3055* (2013.01); *G06F 11/328* (2013.01); *G06F 13/4068* (2013.01); *G06F 13/4282* (2013.01)

(58) Field of Classification Search
  CPC .............. G06F 11/3055; G06F 11/328; G06F 13/4068; G06F 13/4282
  See application file for complete search history.

(56) References Cited

U.S. PATENT DOCUMENTS

| | | | |
|---|---|---|---|
| 2006/0215687 A1* | 9/2006 | Lee | H04L 12/44 370/463 |
| 2010/0023660 A1* | 1/2010 | Liu | G06F 3/14 710/65 |
| 2014/0281109 A1* | 9/2014 | Trethewey | G06F 13/126 710/313 |
| 2015/0074323 A1* | 3/2015 | Chumbalkar | G06F 13/4022 710/316 |

(Continued)

FOREIGN PATENT DOCUMENTS

| TW | 201631487 A | 9/2016 |
|---|---|---|
| TW | 202113557 A | 4/2021 |

*Primary Examiner* — Henry Tsai
*Assistant Examiner* — Harry Z Wang
(74) *Attorney, Agent, or Firm* — CKC & Partners Co., LLC

(57) ABSTRACT

An electronic system includes a first electronic device and a second electronic device. The first electronic device includes a monitoring chip and a hub chip. The monitoring chip is coupled to an upstream port of the hub chip through a first connection and is coupled to the hub chip through a second connection. The second electronic device is configured to couple a downstream port of the hub chip. The monitoring chip is configured to acquire connection information of the second electronic device through the first connection, and acquire status information of the second electronic device through the second connection. The first electronic device is configured to control at least one third electronic device according to the connection information and the status information.

18 Claims, 6 Drawing Sheets

(56) References Cited

U.S. PATENT DOCUMENTS

2015/0365237 A1* 12/2015 Soffer ................ G06F 13/105
  726/20
2016/0117276 A1* 4/2016 Park .................. G06F 13/385
  710/63

* cited by examiner

CIN'

| address of electronic device 120 | ... | address of hub chip 112 | port | ... | action data |
|---|---|---|---|---|---|
| 8 | | 7 | 1 | | 01_00_00_00_00 |

FIG. 3

| bit | name | value |
|---|---|---|
| 0 | connect | 1 |
| 1 | enable | 0 |
| 2 | suspend | 0 |
| 3 | overcurrent | 0 |
| 4 | reset | 0 |
| 5 | power saving | 0 |
| 8 | power | 1 |
| 9 | loe-speed | 1 |
| 10 | high-speed | 0 |
| 11 | test | 0 |
| 12 | indicator | 0 |

FIG. 5

ELECTRONIC SYSTEM, MONITORING CHIP, AND OPERATION METHOD

RELATED APPLICATIONS

This application claims priority to Taiwanese Application Serial Number 111126537, filed Jul. 14, 2022, which is herein incorporated by reference.

BACKGROUND

Technical Field

The present disclosure relates to technology related to hub technology. More particularly, the present disclosure relates to an electronic system, a monitoring chip, and an operation method.

Description of Related Art

With development of technology, various electronic products are developed, such as: personal desktop computers, laptop computers, or other electronic systems. In some applications, hub devices can be used to enable multiple electronic devices to transmit data or power at the same time.

SUMMARY

Some aspects of the present disclosure are to provide an electronic system. The electronic system includes a first electronic device and a second electronic device. The first electronic device includes a monitoring chip and a hub chip. The monitoring chip is coupled to an upstream port of the hub chip through a first connection and is coupled to the hub chip through a second connection. The second electronic device is configured to couple a downstream port of the hub chip. The monitoring chip is configured to acquire connection information of the second electronic device through the first connection, and acquire status information of the second electronic device through the second connection. The first electronic device is configured to control at least one third electronic device according to the connection information and the status information.

Some aspects of the present disclosure are to provide a monitoring chip. The monitoring chip is disposed in a first electronic device, is coupled to an upstream port of the hub chip through a first connection, and is coupled to the hub chip through a second connection. The monitoring chip is further configured to acquire connection information of the second electronic device coupled to a downstream port of the hub chip through the first connection, and acquire status information of the second electronic device through the second connection for the first electronic device to control at least one third electronic device.

Some aspects of the present disclosure are to provide an operation method. The operation method includes following operations: acquiring, by a monitoring chip in a first electronic device, connection information of a second electronic device through a first connection, in which the monitoring chip is coupled to an upstream port of a hub chip through the first connection and the second electronic device is coupled to a downstream port of the hub chip; acquiring, by the monitoring chip, status information of the second electronic device through a second connection, in which the monitoring chip is coupled to the hub chip through the second connection; and controlling, by the first electronic device, at least one third electronic device according to the connection information and the status information.

As described above, in the present disclosure, the monitoring chip (coupled to the upstream of the hub chip) in the first electronic device can obtain the connection information and the status information of the second electronic device (coupled to the downstream of the hub chip) through two connections. Thus, the first electronic device can control other electronic devices (e.g., the third electronic device) according to the two kinds of information.

BRIEF DESCRIPTION OF THE DRAWINGS

The disclosure can be more fully understood by reading the following detailed description of the embodiment, with reference made to the accompanying drawings as follows:

FIG. 3 is a schematic diagram of reorganized connection information according to some embodiments of the present disclosure.

FIG. 5 is a schematic diagram of bit information in the status information according to some embodiments of the present disclosure.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
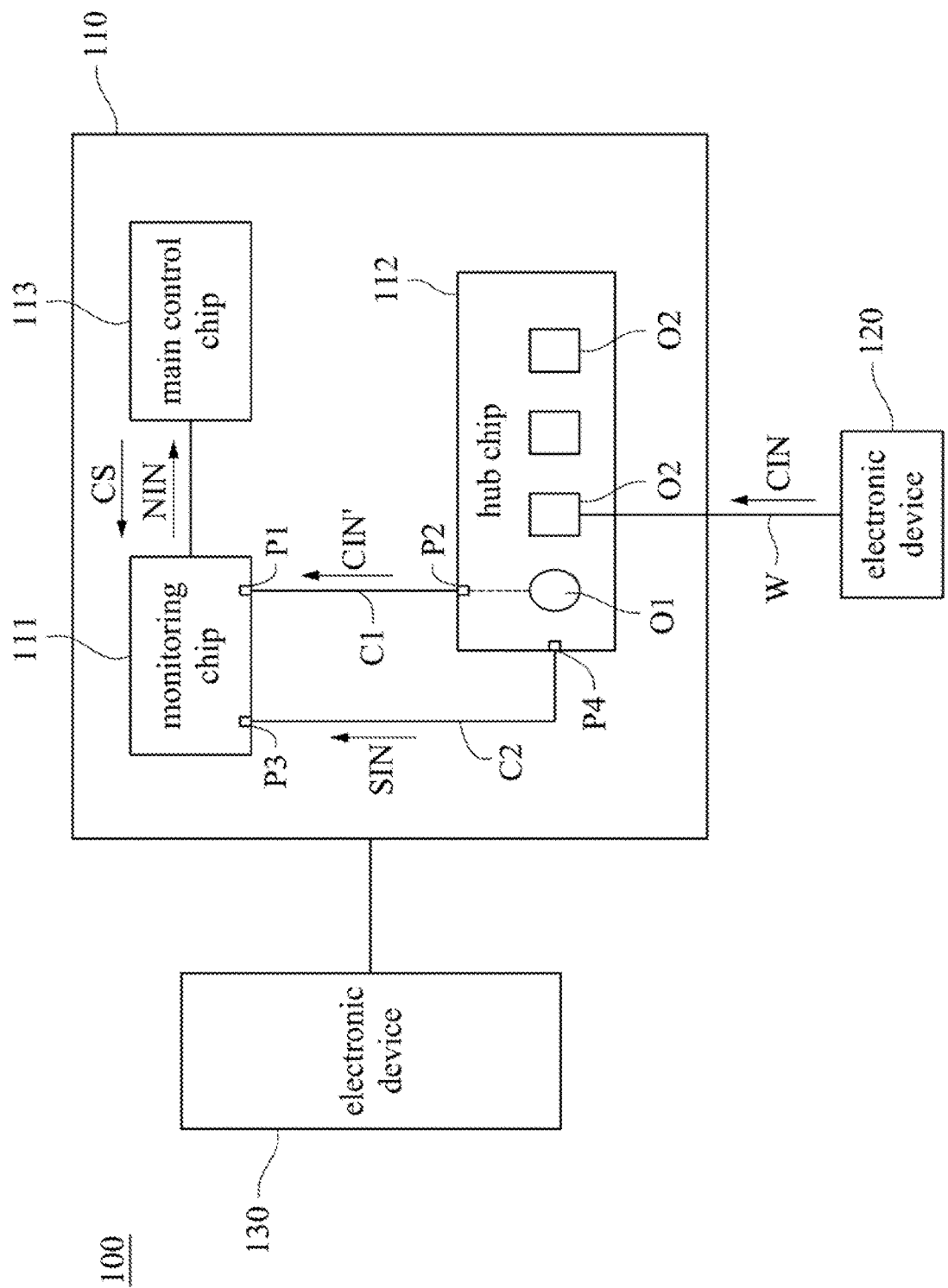
FIG. 1 is a schematic diagram of an electronic system according to some embodiments of the present disclosure.

Reference is made to FIG. 1. FIG. 1 is a schematic diagram of an electronic system 100 according to some embodiments of the present disclosure.

As illustrated in FIG. 1, the electronic system 100 includes an electronic device 110, an electronic device 120, and an electronic device 130. The electronic device 110 can be coupled to the electronic device 120 and the electronic device 130.

The electronic device 110 includes a monitoring chip 111, a hub chip 112, and a main control chip 113. The monitoring chip 111, the hub chip 112, and the main control chip 113 can be disposed on a printed circuit board (PCB). As illustrated in FIG. 1, the hub chip 112 can include at least one upstream port O1 and a plurality of downstream ports O2.

The monitoring chip 111 can be coupled to the upstream port O1 of the hub chip 112 through a connection C1. In addition, the monitoring chip 111 can be coupled to the hub chip 112 through a connection C2. For example, the monitoring chip 111 can include a pin P1 and a pin P3 on the printed circuit board, and the hub chip 112 can include a pin P2 and a pin P4 on the printed circuit board, in which the pin P2 is coupled to the upstream port O1. One metal wire can be connected between the pin P1 and the pin P2 to from the connection C1, and another one metal wire can be connected between the pin P3 and the pin P4 to from the connection C2.

In practical applications, the connection C1 can support a first transmission protocol, and the connection C2 can support a second transmission protocol. The second transmission protocol can be different from the first transmission protocol. In some embodiments, the first transmission protocol can be a universal serial bus (USB) protocol, and the second transmission protocol can be an inter-integrated circuit ($I^2C$) bus protocol or a system management bus (SMBus) protocol. However, the present disclosure is not limited thereto.

The electronic device 120 can be coupled to the downstream port O2 of the hub chip 112. For example, the electronic device 120 can include a cable W. One end of the cable W can be coupled to a body of the electronic device 120, and the other end of the cable W can be inserted into the downstream port O2 of the hub chip 112. In practical applications, the cable W also supports the first transmission protocol. In other words, the cable W and the connection C1 support the same transmission protocol (e.g., the universal serial bus transmission protocol). However, since the connection C2 support other transmission protocol, the connection C2 can be regarded as a sideband connection.

The monitoring chip 111 can be coupled to the main control chip 113. In operation, the electronic device 120 can transmit connection information CIN to the hub chip 112 through the cable W. The hub chip 112 can reorganize the connection information CIN to generate reorganized connection information CIN'. Then, the reorganized connection information CIN' can be transmitted to the monitoring chip 111 through the connection C1. In addition, since the hub chip 112 can acquire status information SIN of the electronic device 120 by itself, the monitoring chip 111 can obtain the status information SIN of the electronic device 120 from the hub chip 112 through the connection C2. Then, the monitoring chip 111 can transmit a notification signal NIN to the main control chip 113 according to the reorganized connection information CIN' and the status information SIN. The main control chip 113 can transmit a control signal CS to the monitoring chip 111 in response to the notification signal NIN so as to control the electronic device 130.

Figure 2:
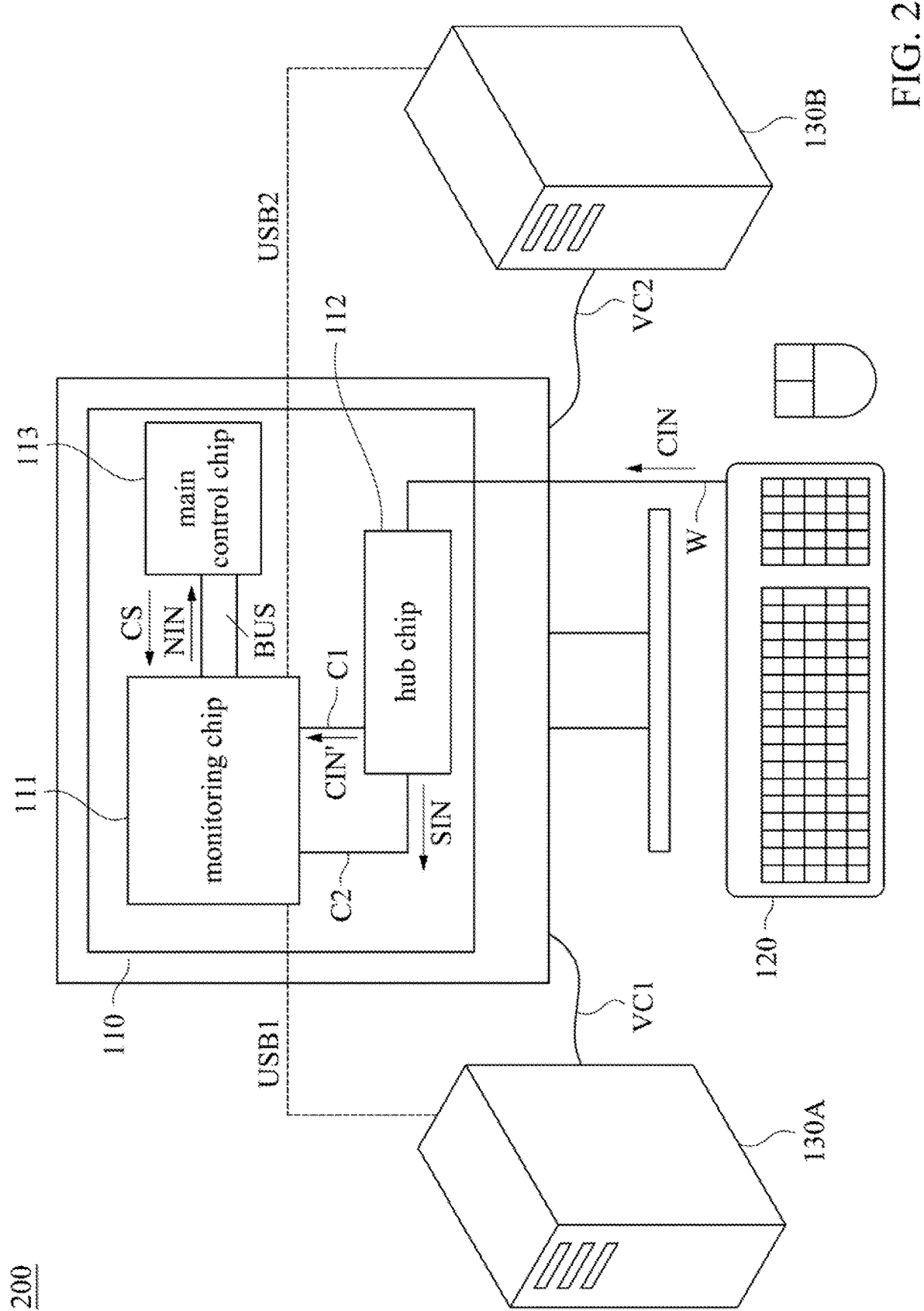
FIG. 2 is a schematic diagram of a computer system according to some embodiments of the present disclosure.

References are made to FIG. 1 and FIG. 2. FIG. 2 is a schematic diagram of a computer system 200 according to some embodiments of the present disclosure. In some embodiments, the electronic system 100 in FIG. 1 can be applied to the computer system 200 in FIG. 2.

In the example of FIG. 2, the electronic device 110 is a display screen. In this example, the main control chip 113 can include a scaler controller circuit to control the display function. In the example of FIG. 2, the electronic device 120 is a keyboard, but the present disclosure is not limited thereto. The electronic device 120 can also be a mouse or a universal serial bus flash drive. In some embodiments, the electronic device 130A and the electronic device 130B (used to implement the electronic device 130 in FIG. 1) are computer hosts, and different operation systems are installed in the computer hosts respectively. In this example, the electronic device 130A and the electronic device 130B are desktop computers. However, in some other examples, the electronic device 130A can be a desktop computer, and the electronic device 130B can be a laptop.

In practical applications, the electronic device 130A can be coupled to the electronic device 110 through a video cable VC1. The video cable VC1 is used to transmit images of the electronic device 130A. Similarly, the electronic device 130B can be coupled to the electronic device 110 through a video cable VC2. The video cable VC2 is used to transmit images of the electronic device 130B.

In addition, the electronic device 130A can be coupled to the monitoring chip 111 in the electronic device 110 through a universal serial bus cable USB1. The monitoring chip 111 can control the electronic device 130A through the universal serial bus cable USB1. Similarly, the electronic device 130B can be coupled to the monitoring chip 111 in the electronic device 110 through a universal serial bus cable USB2. The monitoring chip 111 can control the electronic device 130B through the universal serial bus cable USB2.

As described above, the monitoring chip 111 can acquire the reorganized connection information CIN' from the hub chip 112 through the connection C1. Reference is made to FIG. 3. FIG. 3 is a schematic diagram of the reorganized connection information CIN' according to some embodiments of the present disclosure.

As illustrated in FIG. 3, the reorganized connection information CIN' includes an address (e.g., 8) of the electronic device 120, an address (e.g., 7) of the hub chip 112, a port number (e.g., 1) of the downstream port O2, and action data (e.g., 01_00_00_00_00) of the electronic device 120. In other words, the reorganized connection information CIN' can indicate the electronic device 120, indicate the hub chip 112, indicate which downstream port of the hub chip 112 the electronic device 120 is coupled to, and indicate the type of operation perform by an user on the electronic device 120. For example, it is assumed that the electronic device 120 is a mouse. The action data generated by the electronic device 120 can be 01_00_00_00_00 when the user presses the left button on the mouse.

Figure 4:
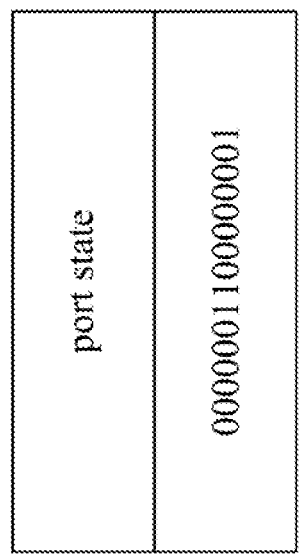
FIG. 4 is a schematic diagram of status information according to some embodiments of the present disclosure.

As described above, the monitoring chip 111 can obtain the status information SIN of the electronic device 120 from the hub chip 112 through the connection C2. References are made to FIG. 4 and FIG. 5. FIG. 4 is a schematic diagram of status information SIN according to some embodiments of the present disclosure. FIG. 5 is a schematic diagram of bit information in the status information SIN according to some embodiments of the present disclosure.

As illustrated in FIG. 4, the status information SIN includes a port state (e.g., 0000001100000001). The port state includes a plurality of bits, and the bits are used to indicate states of the electronic device 120 respectively.

FIG. 5 only shows some of the bits. For example, the first bit (bit 0) indicates whether the electronic device 120 is connected. The second bit (bit 1) indicates whether the electronic device 120 is enabled. The third bit (bit 2) indicates whether the electronic device 120 is suspended. The fourth bit (bit 3) indicates whether the electronic device 120 receives excess current. The fifth bit (bit 4) indicates whether the electronic device 120 has been reset. The sixth bit (bit 5) indicates a power-saving state. The ninth bit (bit 8) indicates whether the electronic device 120 has power. The tenth bit (bit 9) indicates whether the electronic device 120 is in a low-speed state. The eleventh bit (bit 10) indicates whether the electronic device 120 is in a high-speed state. The twelfth bit (bit 11) indicates whether the electronic device 120 is in a test state. The thirteenth bit (bit 12) indicates a light (indicator) control. Accordingly, the bits in the port state can reflect the states of the electronic device 120.

Based on the descriptions above, the combination of the reorganized connection information CIN' and the status information SIN can reflect the operation type perform by a user on the electronic device 120 and the state of the electronic device 120. Reference is made to FIG. 2 again. For example, when a user presses a hotkey on the electronic device 120 (e.g., the keyboard), the monitoring chip 111 can obtain the corresponding reorganized connection information CIN' and the corresponding status information SIN. Then, the monitoring chip 111 can transmit the notification signal NIN to the main control chip 113 according to the two kinds of information. The main control chip 113 can transmit the control signal CS to the monitoring chip 111 in response to the notification signal NIN so as to control the electronic device 130A and the electronic device 130B. For example, the monitoring chip 111 can switch the electronic device 130A and the electronic device 130B through the universal serial bus USB1 and the universal serial bus USB2 according to the control signal CS. When switching to the electronic device 130A, the electronic device 110 (e.g., the display screen) displays the images of the operating system installed in the electronic device 130A. When switching to the electronic device 130B, the electronic device 110 (e.g., the display screen) displays the images of the operating system installed in the electronic device 130B. In other words, the monitoring chip 111 also has a function similar to a multiplexer.

In some embodiments, the notification signal NIN and the control signal CS are transmitted based on a general-purpose input/output (GPIO) protocol.

In some related approaches, a hub device is outside an electronic device (e.g., a display screen) and is coupled to this electronic device through a connection cable. Accordingly, the hub device obtains various information of the electronic device (e.g., the keyboard or the mouse) coupled to its downstream port through the same cable (the same transmission protocol).

Compared to the aforementioned approaches, in the present disclosure, the hub chip 112 can be disposed in the electronic device 110 (e.g., the display screen) to simplify the system structure. For achieving the aforementioned purposes, the monitoring chip 111 in the present disclosure is coupled to upstream port O1 of the hub chip 112. The monitoring chip 111 can acquire the reorganized connection information CIN' of the electronic device 120 through the connection C1, and obtain the status information SIN of the electronic device 120 from the hub chip 112 through the connection C2. Thus, the electronic device 110 can successfully obtain the two kinds of information, and control the electronic device 130 correspondingly (e.g., switching between the electronic device 130A and the electronic device 130B) according to the two kinds of information.

In addition, the main control chip 113 can be coupled to the monitoring chip 111 through a bus BUS. In some embodiments, the bus BUS supports the universal serial bus protocol. The main control chip 113 can be coupled to the electronic device 120 through the bus BUS, the monitoring chip 111, and the hub chip 112. Accordingly, a user can operate the electronic device 120 (e.g., the keyboard) to adjust the characteristics of the electronic device 110 (e.g., the display screen). For example, when the user presses some specific keys on the keyboard, the main control chip 113 can receive commands from the bus BUS and the main control chip 113 can change the brightness, the resolution, or other characteristics of the display screen according to the commands. In some related approaches, some buttons on the display screen are used to adjust their characteristics. However, these buttons are disposed at positions that are more difficult to press. Therefore, compared to these related approaches, the method of the present disclosure has the advantage of ease to operate.

Figure 6:
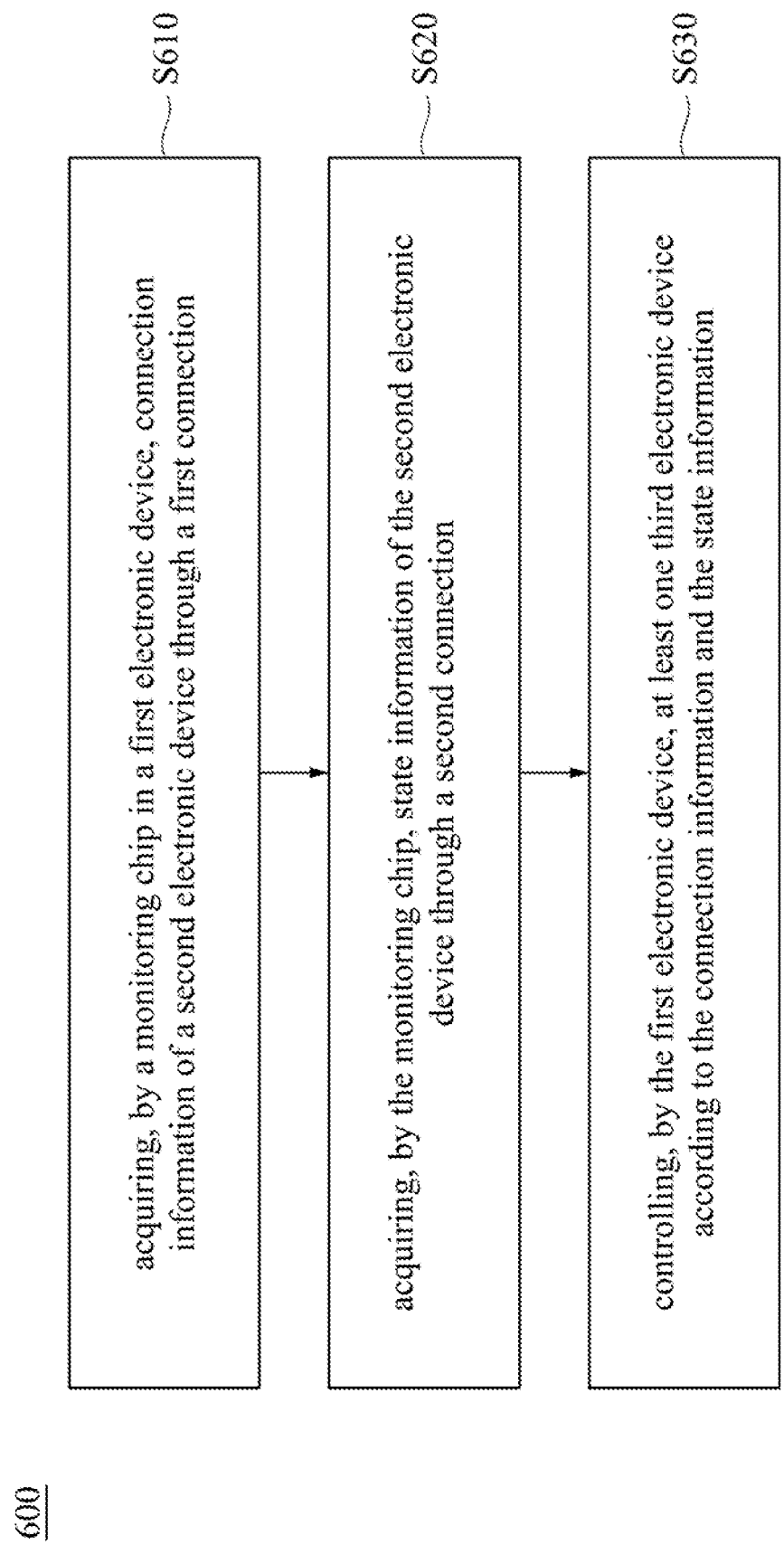
FIG. 6 is a flow diagram of an operation method according to some embodiments of the present disclosure.

Reference is made to FIG. 6. FIG. 6 is a flow diagram of an operation method 600 according to some embodiments of the present disclosure. As illustrated in FIG. 6, the operation method 600 includes operation S610, operation S620, and operation S630.

In some embodiments, the operation method 600 can be applied to the electronic system 100 in FIG. 1 or the computer system 200 in FIG. 2, but the present disclosure is not limited thereto. For ease of understanding, the operation method 600 is described with reference to the electronic system 100 in FIG. 1.

In operation S610, the monitoring chip 111 in the electronic device 110 acquires connection information CIN of the electronic device 120 through the connection C1. In some embodiments, the connection C1 supports the universal serial bus protocol.

In operation S620, the monitoring chip 111 acquires the status information SIN of the electronic device 120 through the connection C2. In some embodiments, the connection C2 supports the inter-integrated circuit bus protocol or the system management bus protocol.

In operation S630, the electronic device 110 controls the electronic device 130 according to the connection information CIN and the status information SIN. For example, the monitoring chip 111 can transmit the notification signal NIN to the main control chip 113 according to the connection information CIN and the status information SIN. The main control chip 113 can transmit the control signal CS to the monitoring chip 111 in response to the notification signal NIN to control the one or more electronic devices 130.

As described above, in the present disclosure, the monitoring chip (coupled to the upstream of the hub chip) in the first electronic device can obtain the connection information and the status information of the second electronic device (coupled to the downstream of the hub chip) through two connections. Thus, the first electronic device can control other electronic devices (e.g., the third electronic device) according to the two kinds of information.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic system, comprising:
a first electronic device comprising a monitoring chip and a hub chip, wherein the monitoring chip is coupled to an upstream port of the hub chip through a first connection and is coupled to the hub chip through a second connection; and
a second electronic device configured to couple a downstream port of the hub chip,
wherein the monitoring chip is configured to acquire connection information of the second electronic device through the first connection, and acquire status information of the second electronic device through the second connection,
wherein the first electronic device is configured to control at least one third electronic device according to the connection information and the status information,
wherein the connection information comprises a first address of the second electronic device, a second address of the hub chip, a port number of the downstream port, and action data of the second electronic device.

2. The electronic system of claim 1, wherein the first electronic device further comprises a main control chip, the main control chip is coupled to the monitoring chip, wherein the monitoring chip transmits a notification signal to the main control chip according to the connection information and the status information, and the main control chip transmits a control signal to the monitoring chip in response to the notification signal to control the at least one third electronic device.

3. The electronic system of claim 2, wherein the at least one third electronic device comprises a plurality of third electronic devices.

4. The electronic system of claim 3, wherein the third electronic devices are a plurality of computer hosts, and the plurality of computer hosts correspond to different operation systems respectively, wherein the main control chip transmits the control signal to the monitoring chip in response to the notification signal to switch among the third electronic devices.

5. The electronic system of claim 4, wherein the first electronic device is a display screen, and the display screen is configured to display an image corresponding to one of the operation systems.

6. The electronic system of claim 1, wherein the first connection supports a first transmission protocol, the second connection supports a second transmission protocol, and the second transmission protocol is different from the first transmission protocol.

7. The electronic system of claim 6, wherein the first transmission protocol is a universal serial bus protocol, and the second transmission protocol is an inter-integrated circuit bus protocol or a system management bus protocol.

8. The electronic system of claim 1, wherein the monitoring chip and the hub chip are disposed on a printed circuit board, and the first connection and the second connection are formed by a plurality of pins and a plurality of metal wires.

9. The electronic system of claim 1, wherein the first electronic device further comprises a main control chip, and the main control chip is coupled to the second electronic device through a universal serial bus protocol, the monitoring chip, and the hub chip, wherein the main control chip changes a characteristic of the first electronic device in response to an operation on the second electronic device.

10. A monitoring chip disposed in a first electronic device, coupled to an upstream port of a hub chip through a first connection, and coupled to the hub chip through a second connection, wherein the monitoring chip is further configured to acquire connection information of a second electronic device coupled to a downstream port of the hub chip through the first connection, and acquire status information of the second electronic device through the second connection for the first electronic device to control at least one third electronic device,
wherein the connection information comprises a first address of the second electronic device, a second address of the hub chip, a port number of the downstream port, and action data of the second electronic device.

11. The monitoring chip of claim 10, wherein the first electronic device further comprises a main control chip, the main control chip is coupled to the monitoring chip, wherein the monitoring chip transmits a notification signal to the main control chip according to the connection information and the status information, and the main control chip transmits a control signal to the monitoring chip in response to the notification signal to control the at least one third electronic device.

12. The monitoring chip of claim 11, wherein the at least one third electronic device comprises a plurality of third electronic devices.

13. The monitoring chip of claim 12, wherein the third electronic devices are a plurality of computer hosts, and the plurality of computer hosts correspond to different operation systems respectively, wherein the main control chip transmits the control signal to the monitoring chip in response to the notification signal to switch among the third electronic devices.

14. The monitoring chip of claim 13, wherein the first electronic device is a display screen, and the display screen is configured to display an image corresponding to one of the operation systems.

15. The monitoring chip of claim 10, wherein the first connection supports a first transmission protocol, the second connection supports a second transmission protocol, and the second transmission protocol is different from the first transmission protocol.

16. The monitoring chip of claim 10, wherein the monitoring chip and the hub chip are disposed on a printed circuit board, and the first connection and the second connection are formed by a plurality of pins and a plurality of metal wires.

17. The monitoring chip of claim 10, wherein the first electronic device further comprises a main control chip, and the main control chip is coupled to the second electronic device through a universal serial bus protocol, the monitoring chip, and the hub chip, wherein the main control chip changes a characteristic of the first electronic device in response to an operation on the second electronic device.

18. An operation method, comprising:
acquiring, by a monitoring chip in a first electronic device, connection information of a second electronic device through a first connection, wherein the monitoring chip is coupled to an upstream port of a hub chip through the first connection and the second electronic device is coupled to a downstream port of the hub chip;
acquiring, by the monitoring chip, status information of the second electronic device through a second connection, wherein the monitoring chip is coupled to the hub chip through the second connection; and
controlling, by the first electronic device, at least one third electronic device according to the connection information and the status information,
wherein the connection information comprises a first address of the second electronic device, a second address of the hub chip, a port number of the downstream port, and action data of the second electronic device.

* * * * *